A. RIDD.
TEAT CUP FOR MILKING MACHINES.
APPLICATION FILED JUNE 14, 1911.
1,000,948.
Patented Aug. 15, 1911.
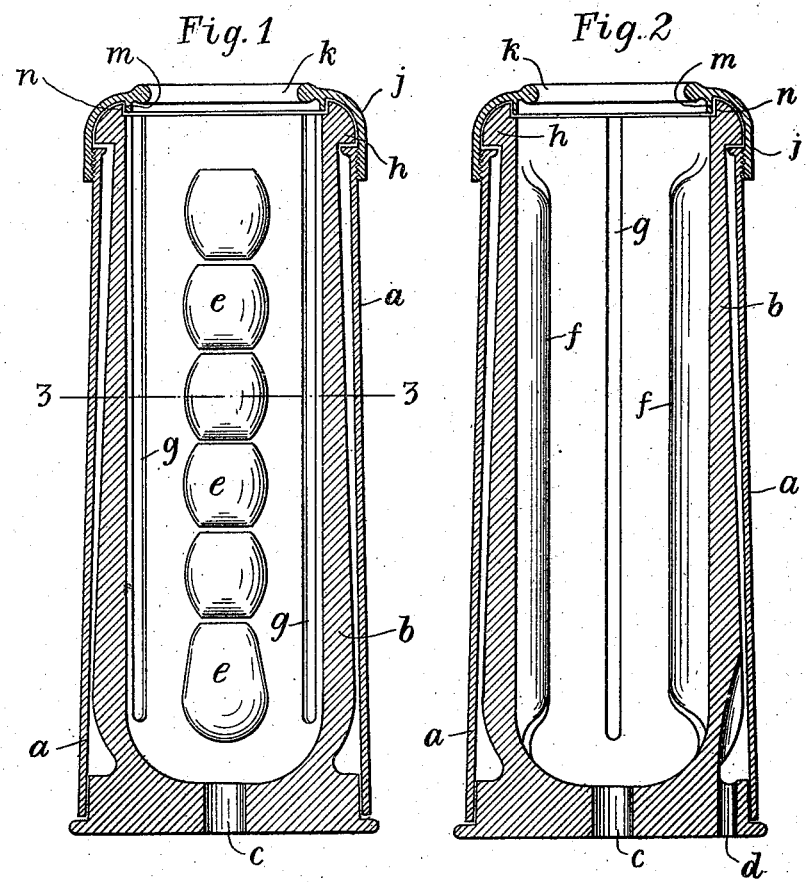
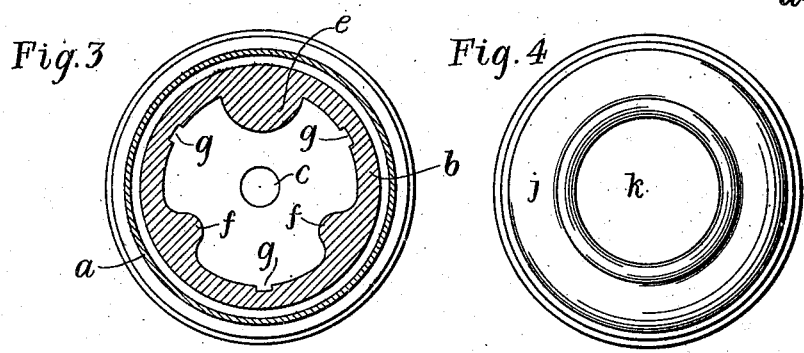
WITNESSES:
David J. Walsh
Fred W. Howard.
INVENTOR.
AMBROSE RIDD
BY
ATTORNEY.

UNITED STATES PATENT OFFICE.

AMBROSE RIDD, OF WAIPUKU, TARANAKI, NEW ZEALAND.

TEAT-CUP FOR MILKING-MACHINES.

1,000,948.   Specification of Letters Patent.   Patented Aug. 15, 1911.

Application filed June 14, 1911. Serial No. 633,213.

*To all whom it may concern:*

Be it known that I, AMBROSE RIDD, a subject of the King of Great Britain, residing at Waipuku, Taranaki, in the Dominion of New Zealand, have invented a new and useful Improved Teat-Cup for Milking-Machines; and I do hereby declare the following to be a full, clear, and exact description of the same.

This invention relates to that class of teat cups for milking machines consisting of an outer rigid casing and an inner flexible lining adapted to receive the teat and to be connected with the vacuum action of the milk pail, while the space between the lining and the casing is alternately connected with two different degrees of air pressure by the action of a pulsator in order that the lining may be alternately inflated to press upon the teat within it, and deflated to release the teat from pressure.

The invention consists in an improved construction of lining by means of which the action of the human hand upon a teat, when hand milking, may be closely resembled, and in an improved form of cap and mouthpiece for holding the lining in position in the casing.

In describing the invention reference will be made to the accompanying sheet of drawings, in which:—

Figures 1 and 2 are vertical sections through the center of the teat cup but showing the respectively different halves thereof. Fig. 3 is a sectional plan thereof taken on the line 3—3 of Fig. 1. Fig. 4 is a plan of the cup.

The cup is formed as usual with the outer casing $a$ of metallic or other approved material and the inner flexible lining $b$ of rubber into the bottom of which the milk can connection enters through the aperture $c$. $d$ (Fig. 2) is the usual pulsator connection leading into the space between the casing and the lining for the well known purpose.

In this invention the lining is provided with a row of knobs $e$ arranged in line one beneath the other, down its inside surface. It is also provided with two projecting ribs $f$ extending down its inside surface in lines parallel with each other and with the row of knobs $e$. These ribs and the knobs are arranged at equal circumferential distances apart around the lining, as shown in Fig. 3. The lining is weakened at points midway between the knobs and the ribs and between the two ribs, by means of grooves $g$ formed in its inner surface and extending vertically down such surface. The grooves $g$ on the reverse sides of the knobs are made of greater depth and width to the groove $g$ between the two ribs, for a purpose to be hereinafter more fully referred to. The lining is also made to increase in thickness from its upper to its lower end, the internal diameter however being uniform throughout the height of the lining, as shown in Figs. 1 and 2. The actions of the pulsator upon the lining will thus be such that the teat inserted therein will first be squeezed at its upper end and the squeeze will gradually extend down to its point and this squeezing action by reason of the special construction of lining employed will be transmitted to the teat through the engagement therewith of the knobs $e$ and ribs $f$. The teat will thus be gripped at three equidistant points around it, the knobs $e$ pressing thereon in regular order from top to bottom. By reason also of the grooves on both sides of the knobs being deeper and wider than the other, the portion of the lining having the knobs thereon will respond first to the action of the pulsator. Consequently the knobs will first engage with the teat and cause it to be moved in toward the ribs which will then engage with it and act as a cushion against which the knobs will press it. The action of the lining on the teat will thus resemble the action of the human hand when hand milking, in that the ribs will represent the folds in the palm of the hand while the knobs represent the balls of the fingers pressing the teat against the palm and working in order from the top to the bottom.

The upper end of the lining is formed with a flange $h$ which overhangs the top edge of the casing $a$ and the upper surface of which is curved as shown in Figs. 1 and 2. The mouthpiece cap $j$ is shaped to fit down over this curved top and is formed with a central aperture $k$ to receive the teat and provided with a downwardly extending flange $m$ around the edge of such opening. This flange is adapted to fit into a ledge $n$ formed around the inside top edge of the lining. The cap is screwed or otherwise fastened on to the casing so that it will cause the top of the lining to be caught and held firmly between it and the casing top. The edge of the aperture $k$ is rounded in the usual way to prevent it chafing the teat passed in through it.

What I do claim as my invention, and desire to secure by Letters Patent is:—

1. In milking machine teat cups, an outer rigid casing and an inner flexible lining secured within the casing and formed with projecting knobs arranged in a row vertically down its inside surface and with two ribs projecting from its inner surface and extending in parallel lines with the row of knobs at equal circumferential distances apart therefrom, substantially as specified.

2. In milking machine teat cups, an outer rigid casing and an inner flexible lining secured within the casing and formed with projecting knobs arranged in a row one beneath the other upon its inner surface and with two projecting ribs on such inner surface extending in lines parallel with the row of knobs and at equal circumferential distances apart therefrom and with two grooves on such inside surface extending down it between the row of knobs and the respective ribs and with a groove of lesser depth and width than the other grooves extending down between the two ribs, substantially as specified.

3. In milking machine teat cups, an outer rigid casing, an inner flexible lining formed with a flange around its top edge overhanging the top end of the casing and having a curved upper surface, a mouthpiece adapted to fit on to the top of the flange and to be secured upon the casing, an aperture in the center of such mouthpiece and a downwardly projecting flange around the edge of such aperture, a row of knobs extending down the inside of the lining and two ribs extending down the inside lining in parallel lines with the row of knobs and at equal circumferential distances apart therefrom, substantially as herein specified.

In testimony whereof, I have signed this specification in the presence of two subscribing witnesses.

AMBROSE RIDD.

Witnesses:
FREDERIC H. CLAPHAM,
SYDNEY CAFFERY.